United States Patent [19]
Shirayanagi

[11] Patent Number: 5,844,657
[45] Date of Patent: Dec. 1, 1998

[54] PROGRESSIVE POWER LENS AND MOLD FOR PRODUCING SAME

[75] Inventor: Moriyasu Shirayanagi, Tokyo, Japan

[73] Assignee: Asahi Kogaku Kogyo Kabushiki Kaisha, Tokyo, Japan

[21] Appl. No.: 517,438

[22] Filed: Aug. 21, 1995

[30] Foreign Application Priority Data

Aug. 22, 1994 [JP] Japan .................................. 6-197019

[51] Int. Cl.$^6$ .............................. G02C 7/06; B29D 11/00
[52] U.S. Cl. ............................................ 351/169; 425/808
[58] Field of Search ................... 351/168–172; 425/808

[56] References Cited

U.S. PATENT DOCUMENTS

| | | | |
|---|---|---|---|
| 4,118,853 | 10/1978 | Mignen | 351/169 |
| 4,950,057 | 8/1990 | Shirayanagi | 351/169 |
| 5,096,626 | 3/1992 | Takamizawa et al. | 264/1.7 |
| 5,235,359 | 8/1993 | Chauveau et al. | 351/169 |

FOREIGN PATENT DOCUMENTS

| | | |
|---|---|---|
| 0454554 | 10/1991 | European Pat. Off. . |
| 59-189314 | 10/1984 | Japan . |

*Primary Examiner*—Scott J. Sugarman
*Attorney, Agent, or Firm*—Greenblum & Bernstein, P.L.C.

[57] ABSTRACT

A progressive power lens has an effective surface including a progressive surface which progressively varies the power, and a peripheral rim surface portion which surrounds the progressive surface yet does not function as an effective surface. The rim surface is curved. The invention is also directed to a mold to produce a progressive power lens. The mold includes a portion which forms progressive surface which progressively varies the power of the lens and a curved rim surface forming portion which forms a rim surface of the lens which does not function as a progressive surface.

21 Claims, 14 Drawing Sheets

PROGRESSIVE POWER LENS AND MOLD FOR PRODUCING SAME

BACKGROUND OF THE INVENTION

1. Field of the Invention

The present invention relates to a progressive power (multi-focal) lens for eyeglasses, in which the surface power continuously changes from a distance portion to a near portion. In particular, the present invention relates to a progressive power lens which is provided on a peripheral edge thereof with a rim surface portion whose width is reduced to provide an increased effective surface area of the lens. The present invention also relates to a mold which produce such a progressive power lens.

2. Description of Related Art

In a known process of producing a plastic lens for eyeglasses, a monomeric material 54 in liquid state is introduced and heated in a cavity defined between molds 51, 52 and a gasket 53 to polymerize the same, so that a lens 50 of a solid polymer can be obtained, as shown in FIG. 16.

The gasket 53 is made of a relatively elastically deformable material to confine the monomer 54 in the mold cavity defined between the molds 51 and 52 and to absorb a change in volume due to the polymerization from a monomer to a polymer.

The mold to produce a plastic single focal lens or a plastic multi-focus lens having a distance portion and a near portion separate from the distance portion, or a semi-product thereof, is usually provided with a spherical mold surface, and hence, the thickness T of the gasket 53 to be used is constant over the entire periphery of the lens. However, for a mold to produce an astigmatic power lens as a final product, a gasket whose thickness varies in accordance with a shape of a toric lens surface must be used. To reduce the number of kinds of gaskets to be prepared, the toric surfaces are systematized.

In the mold for the progressive power lens, the shape of the surface thereof on the progressive surface (progressive side) is a complex aspherical surface. Moreover, for example, in the arrangement of the mold and the gaskets as shown in FIG. 16, the thickness of the gaskets are not uniform. In particular, in a mold for the progressive power lens whose optical center is deviated from the center of the circle (diameter) of the lens, the change in the thickness of the gasket, along the outer periphery thereof, is much more complicated.

Assuming that, in coordinate systems as shown in FIGS. 17 and 18 in which the diameters of the lens 50 and the molds 51, 52 are indicated by 55 and 56, respectively, and coordinates Z1 and Z2 (FIG. 18) of both surfaces of the lens 50 at an optional angle θ are represented by the Z-axis, a graph as shown in FIG. 19 is obtained. The distance between Z1 and Z2, at an optional angle θ, corresponds to the thickness T of the gasket at the angle θ.

A progressive power lens includes a base curve representing the power of the distance portion and the power of the near portion in combination (note that a difference between the power of the distance portion and the power of the near portion is referred to as "addition power"). There are more than 100 combinations of the base curve and the power of the near portion for one lens system (product). It is therefore impractical to prepare many gaskets corresponding to these combinations in view of the production cost or stocking thereof.

To this end, the mold 51, which forms the progressive surface of the lens, is ground flat at the peripheral portion, so that the rim surface portion (flat surface portion or non-progressive focus area) 58, which does not serve as a progressive surface (effective surface), is formed at the periphery of the lens, as shown in FIG. 20. Consequently, the gasket has a uniform thickness regardless of the angle θ.

Thus, the thickness T of the gasket is uniformly constant over the entire periphery of the lens as seen in FIG. 21, and the gasket can be commonly used with various kinds of progressive surfaces having different base curves and different addition powers in combination.

FIG. 22 shows a mold used to form the progressive surface (effective surface) of a progressive power lens, using the gasket having the rim surface 58. As can be seen in FIG. 22, the rim surface 58 is formed around (on upper and lower sides of) the progressive surface (effective surface) 57. The diameter of the effective progressive surface 57 is reduced in the vertical direction due to the presence of the rim surface portion 58, but no serious problem is practically caused by the reduction of the effective diameter as, in general, the diameter of a frame for eyeglasses in the vertical direction is smaller than the diameter thereof in the horizontal direction.

However, to respond to the requirement to make the eyeglasses thinner and lighter, the radius of the base curve of the progressive power lens has recently been increased. In particular, in the lens having a large negative power, if the flat rim surface 58 is provided, the reduction of the effective diameter in the vertical direction is not acceptable.

FIG. 23 shows an example of a known progressive power lens which is used to correct a highly myopic presbyopia, wherein the addition power is about 3.00 D (diopter), and the surface power of the distance portion is around −7.00 D to −10.00 D (diopter). The effective progressive surface spreads over the whole lens diameter (=70 φ mm) in the horizontal direction, but is reduced in the vertical direction by the rim surface portions 58 each having a width of 8.2 mm, which are formed on the upper and lower sides of the progressive surface 57. The average surface power at the distance reference point 59 is 0.12 D and the refractive index of the blank material is 1.6. The distance reference point refers to a point on the front surface of the lens at which the corrective power for the distance portion shall apply.

FIG. 25 shows vertical and horizontal sections 60 and 61 which define the progressive surface portion 57 of a progressive power lens in an overlapped state. For clarity, in the drawings, the dimension in the longitudinal direction, only, is enlarged. The vertical and horizontal section lines of the rim surface 58 are indicated by dotted and dashed lines. The intersecting points of the progressive surface and the rim surface in the vertical section are indicated at 64 and 64', and the corresponding intersecting points in the horizontal section are indicated by 65 and 65', respectively. The symbol φ designates the angle defined by lines normal to the rim surface and the progressive surface. The parenthesized numerals represent the angle θ in FIG. 17. "Wa" designates the width of the upper rim surface portion, and "Wb" the width of the lower rim surface portion, respectively. The progressive surface is inclined at an appropriate angle so that the width Wa is identical to the width Wb.

FIG. 24 shows another example of a known progressive power lens which is used to correct a myopic presbyopia, wherein the addition power is about 3.00 D (diopter), and the surface power of the distance portion is around −3.00 D to −6.00 D (diopter). The effective progressive surface spreads over the whole lens diameter (=75 φ mm) in the horizontal direction but is reduced in the vertical direction by the rim surface portions 58 each having a width of 4.1 mm, which are formed on the upper and lower sides of the progressive surface 57. The average surface power at the distance reference point 59 is 2.04 D and the refractive index of the blank material is 1.6.

FIG. 26, which corresponds to FIG. 25 shows vertical and horizontal sections 60 and 61 which define the progressive surface portion 57 of a progressive power lens in an overlapped state. FIGS. 25 and 26 show that the widths Wa and Wb of the upper and lower rim surface portions increase as the curvature of the base curve decreases, so long as the addition power is identical.

In the first example of a known progressive power lens, in which the curvature of the base curve is small, the angle $\phi$, defined by the progressive surface and the rim surface at the boundary between the progressive surface 57 and the rim surface 58, as shown in FIG. 25, is small on average. Consequently, the widths Wa and Wb, of the rim surfaces that correspond to the difference in the position between the intersecting points 64 and 64' (in the vertical section) and the intersecting points 65 and 65' (in the horizontal section), are increased.

In the two examples of prior art mentioned above, assuming that the angle $\phi$ is graphed as a function of the angle $\theta$, the graphs of examples 1 and 2 are shown in FIGS. 27 and 28, respectively. The mean value AVG($\phi$) of the angle $\phi$ and the standard deviation STD($\phi$) are defined as follows:

$$AVG(\phi) = \int_0^{360} \phi(\theta)d\theta/360$$

$$STD(\phi) = \left[ \int_0^{360} \{\phi(\theta) - AVG(\phi)\}^2 d\theta/360 \right]^{1/2}$$

The ratio between AVG($\phi$) and STD($\phi$) is an index (measure) which represents the magnitude of the change in the angle defined between the progressive surface and the rim surface. The index is 0.28 in the first example and 0.13 in the second example, respectively.

SUMMARY OF THE INVENTION

The primary object of the present invention is to provide a progressive power lens in which the width of the rim surface can be decreased even when the curvature of the base curve is small.

Another object of the present invention is to provide a mold to produce such a progressive power lens.

Namely, according to the basic concept of the present invention, the angle $\phi$, defined between the progressive surface and the rim surface, is set to be a relatively large value to lower the ratio of STD($\phi$)/AVG($\phi$), to reduce the width of the rim surface. Since the shape of the progressive surface is determined in accordance with requirements of optical performance and ornamental appearance, the rim surface, which is a planar surface in the prior art, is a curved surface in the present invention. The curved surface can be a conical surface, a toric surface, a spherical surface, a cylindrical surface, or a toroidal surface, (such as a doughnut-shaped surface) etc. The curved surface is oriented to project in the direction opposite to the projecting direction of the progressive surface.

According to the present invention, there is provided a progressive power lens having an effective surface, including a progressive surface portion which progressively varies the power, and a peripheral rim surface, which does not function as an effective surface and which is provided to surround the effective surface. The rim surface portion is a curved surface.

In an embodiment of the invention, a progressive power lens satisfies the following relationship:

$$Df \leq 3 \tag{1}$$

$$STD(\phi)/AVG(\phi) \leq 0.15 \tag{2}$$

with

STD($\phi$) represents the standard deviation of $\phi$ over the entire circumferential length of the lens;

AVG($\phi$) represents a mean value of $\phi$ over the entire circumferential length of the lens;

Df (diopter) represents an average surface power at a distance reference point of the progressive surface portion; and, $\phi$ (degree) represents an angle defined by the progressive surface portion and the rim surface portion at a boundary therebetween.

Preferably, the progressive power lens further satisfies the following relationships:

$$Df \leq 2 \tag{3}$$

$$STD(\phi)/AVG(\phi) \leq 0.1 \tag{4}$$

If part of the rim surface is a spherical surface, the spherical surface is oriented to project in the direction opposite to the projecting direction of the progressive surface portion.

In other words, the surface power Ds (diopter) of the spherical surface and the average surface power Df (diopter) at the distance reference point of the progressive surface portion have different signs. Preferably, the progressive power lens satisfies the following relationships:

$$Df \leq 3 \tag{5}$$

$$Ds \leq Df - 2 \tag{6}$$

More preferably, the lens meets the following relationships:

$$Df \leq 2 \tag{7}$$

$$Ds \leq Df - 3 \tag{8}$$

A part of the rim surface can be made of a toric surface or cylindrical surface. Assuming that the surface powers of the toric or cylindrical surface in the vertical direction and in the horizontal direction are Dv (diopter) and Dh (diopter), respectively, it is preferable that Dv is equal to or greater than Dh, i.e., $$Dh \leq Dv \tag{9}$$

If a part of the rim surface is made of a toric surface or a cylindrical surface, the cylindrical surface is oriented to project in the direction opposite to the projecting direction of the progressive surface portion. Preferably, the progressive power lens satisfies the following relationships:

$$Df \leq 3 \quad (10)$$

$$(Dh+Dv)/2 \leq Df-2 \quad (11)$$

A part of the rim surface can be a toroidal surface, including a doughnut-shaped surface.

If a part of the rim surface is a conical surface, the apex thereof is oriented in the direction opposite to the projecting direction of the progressive surface portion. In this case, the progressive power lens preferably satisfies the following relationship:

$$Df \leq 3 \quad (12)$$

$$\Omega \leq 170 \quad (13)$$

with

Df (diopter) represents an average surface power at a distance reference point of the progressive surface portion; and, $\Omega$ (degree) represents an apex angle of the conical surface.

The requirement of $Df \leq 3$ in the formulae (1), (5), (10) and (12) refers to the application of the present invention to a progressive power lens in which the curvature of the base curve is relatively small. If the curvature of the base curve is larger, the width of the rim surface is originally so small that no improvement is necessary.

If the lens meets the requirements defined by the formulae (2), (6), (11) and (13), a reduction in the width of the rim surface can be expected to some extent. However, if the lens does not meet these formulae, no reduction in the width of the rim surface can be obtained.

Formulae (3), (7) and (4), (8) are directed to further increase the value of the angle $\phi$ in order to satisfactorily reduce the width of the rim surface, for the progressive surface whose curvature of the base curve is smaller. However, if the angle $\phi$ is too large, the workability of the lens is remarkably worsened, and a prism error can be easily caused. Consequently, the angle $\phi$ should not be too large.

According to another aspect of the present invention, there is also provided a mold which is used to produce a progressive power lens. A progressive surface forming portion forms a progressive surface portion of the lens; and a rim surface forming portion forms a rim surface portion of the lens, (which does not function as a progressive surface). The rim surface forming portion is a curved surface. The above-mentioned requirements can be equally applied to the curved surface.

The present disclosure relates to subject matter contained in Japanese Patent Application No. 06-197019 (filed on Aug. 22, 1994) which is expressly incorporated herein by reference in its entirety.

BRIEF DESCRIPTION OF THE DRAWINGS

The invention will be described below in detail with reference to the accompanying drawings, in which:

FIG. 15a is a schematic view of a smoothly continuous boundary portion between a progressive surface and a non-progressive surface (rim surface);

FIG. 15b is an enlarged view of a circled portion in FIG. 15a;

DESCRIPTION OF THE PREFERRED EMBODIMENT

Figure 1:
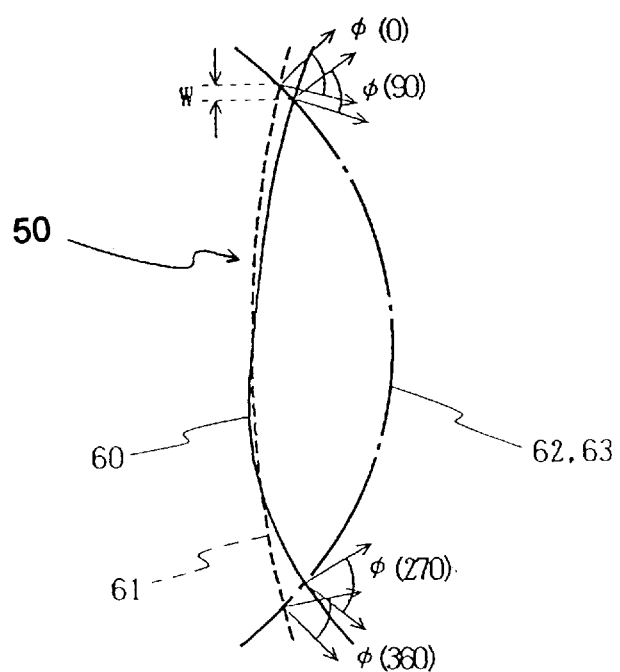
FIG. 1 is a schematic view of curves representing the shape of a progressive power lens on the progressive surface thereof in the horizontal and vertical sections, and a curve representing the shape of a rim surface, in an overlapped state, according to a first embodiment of the present invention.
Figure 2:
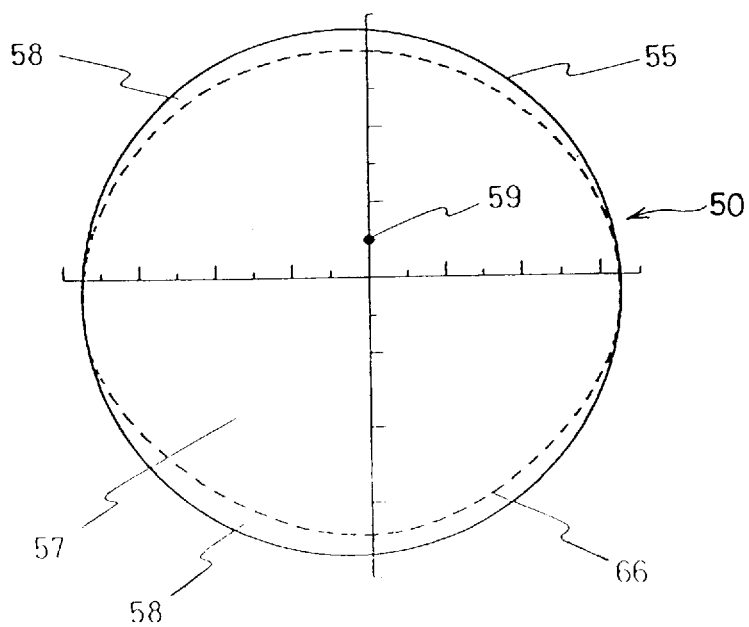
FIG. 2 is a front elevational view of a progressive power lens, according to a first embodiment of the present invention.

FIGS. 1 and 2 show a first embodiment of the present invention.

Figure 25:
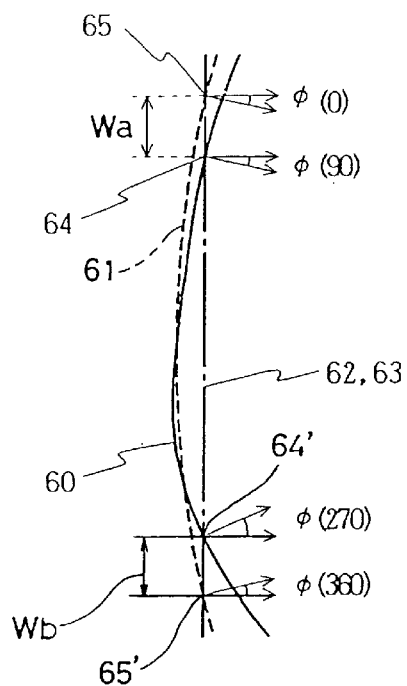
FIG. 25 is an explanatory view of curves representing the shape of a first known progressive power lens on the progressive surface in the horizontal and vertical sections, and a rim surface shown in an overlapped state.
Figure 26:
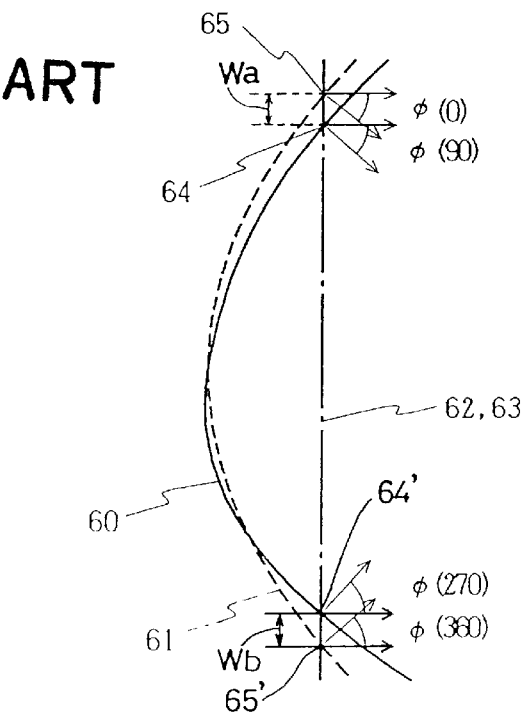
FIG. 26 is a view similar to FIG. 25 for a second known progressive power lens.

In FIG. 1, the progressive power lens 50 whose specification is the same as that of the first known progressive power lens mentioned above is used. In FIGS. 1 and 2, in which only the lateral dimension is enlarged as in FIG. 25, the vertical section 60 and the horizontal section 61 that define the progressive surface (effective surface) 57 are shown in an overlapped state. FIG. 2 shows a front elevational view of a progressive power lens. In the first embodiment, the rim surface 58 defines a part of a spherical surface of −3 D (diopter). The vertical and horizontal section lines 62 and 63 of the rim surface overlap and are indicated by a dotted and dashed line. The width of the rim surface is reduced from 8.2 mm (prior art) to 2.7 mm, which can be practically negligible.

Figure 17:
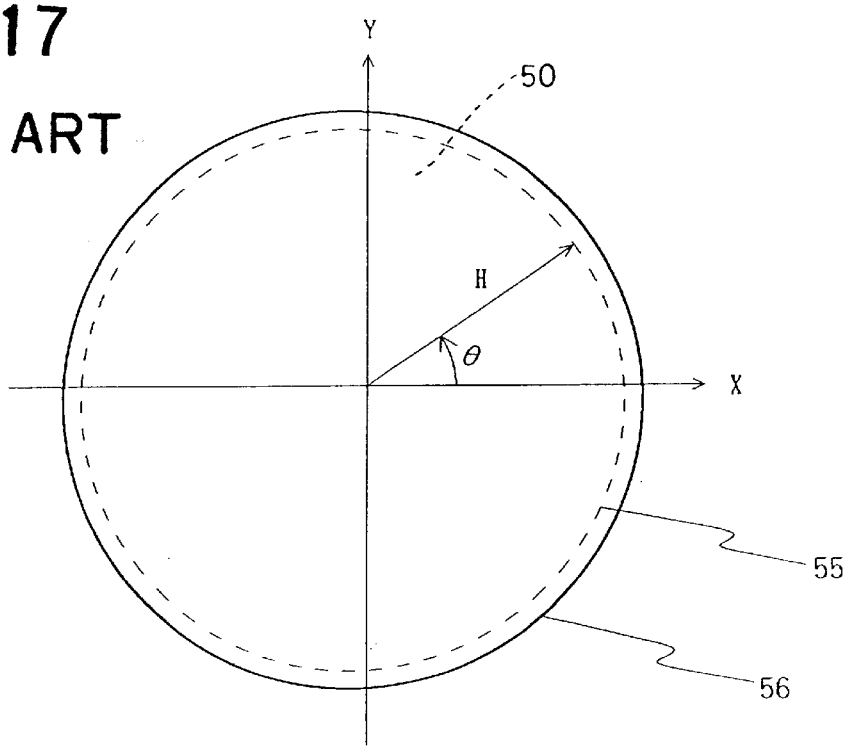
FIGS. 17 and 18 are coordinates of a lens diameter and diameters of molds.
Figure 18:
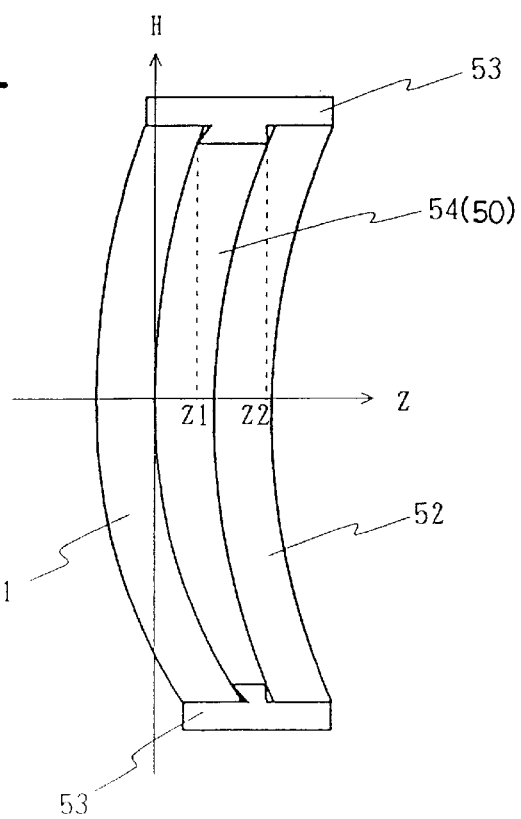
Figure 19:
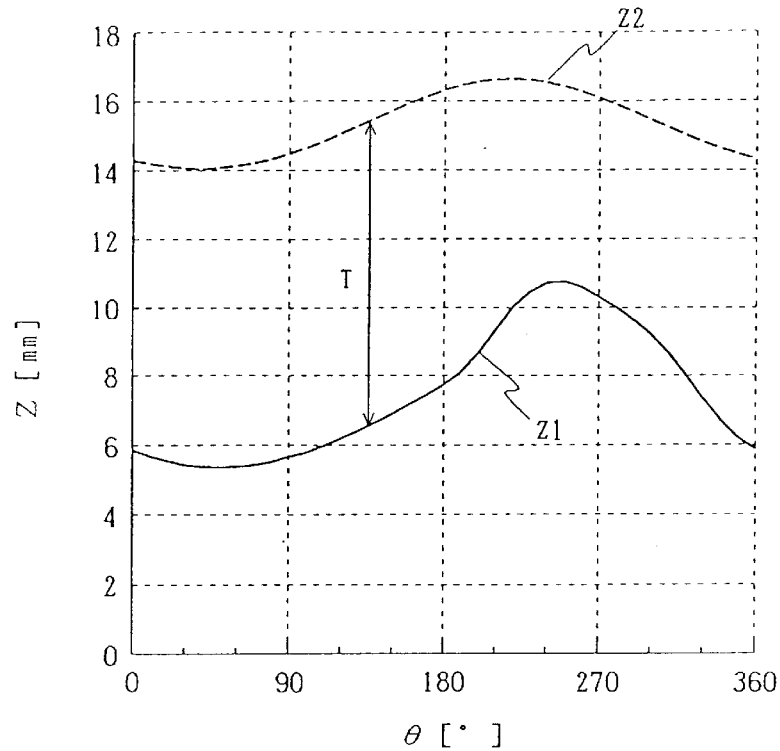
FIG. 19 is a graph showing the thickness of a gasket, wherein said gasket is used for forming a progressive power lens having no rim surface.
Figure 20:
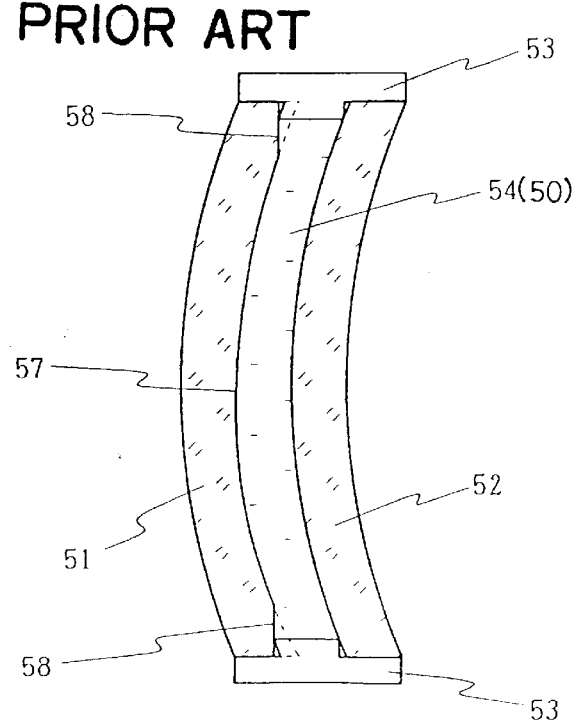
FIG. 20 is a schematic view to explain the process to produce a progressive surface with a flat rim surface according to the prior art.
Figure 21:
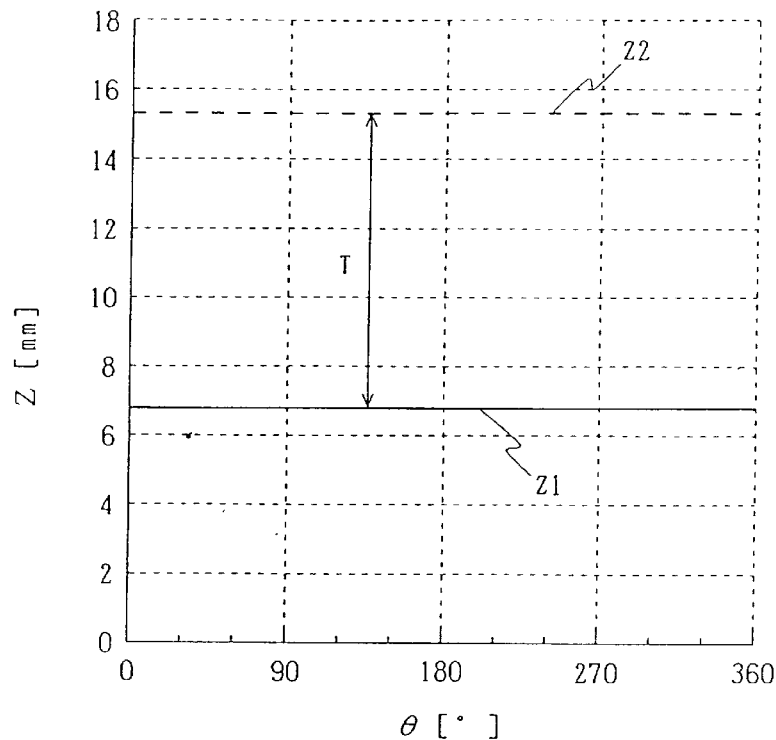
FIG. 21 is a graph showing the uniform thickness of a gasket, wherein said gasket is used for forming a progressive power lens with a rim surface.
Figure 22:
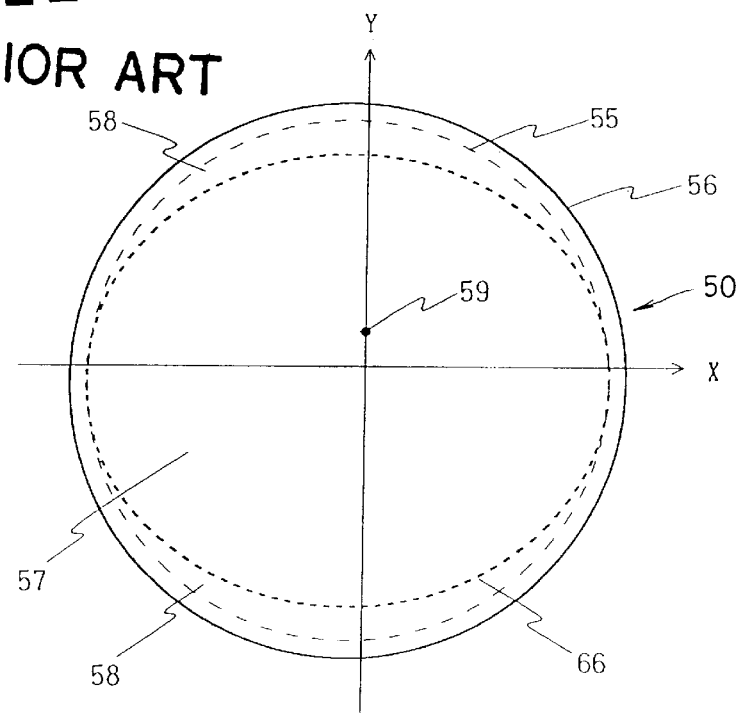
FIG. 22 is a front elevational view of a mold for forming a progressive power lens having a rim surface.
Figure 23:
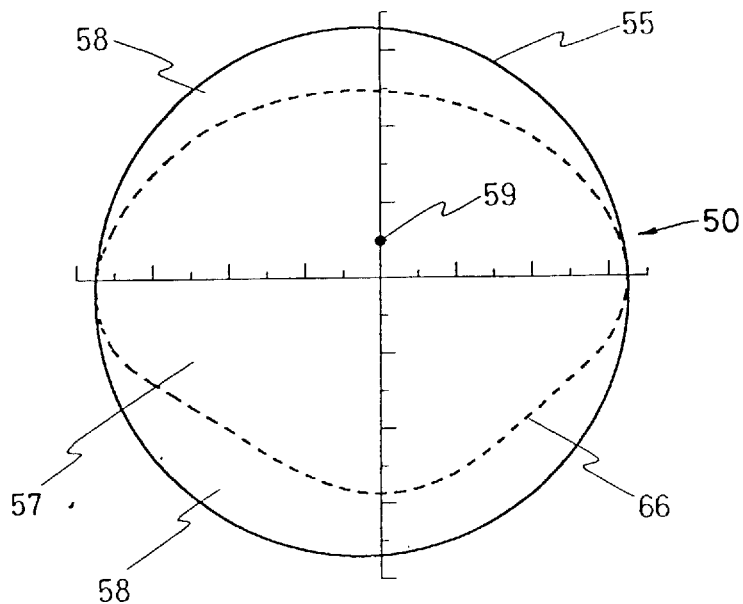
FIG. 23 is a front elevational view of a first known progressive power lens.
Figure 24:
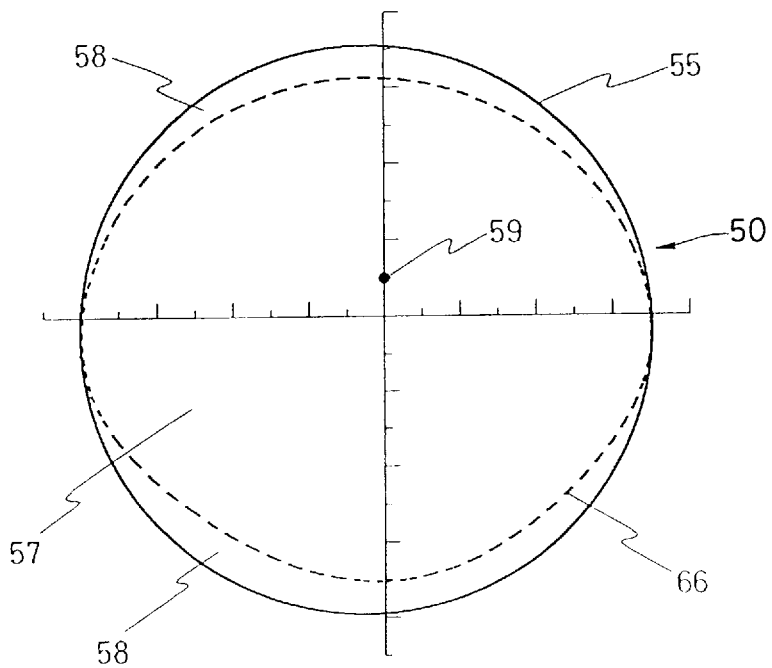
FIG. 24 is a front elevational view of a second known progressive power lens.

In FIGS. 1 and 2, φ designates the angle defined between the progressive surface 57 and the rim surface 58 as in the prior art, and the parenthesized numerals designate the angle θ in FIG. 17.

Figure 3:
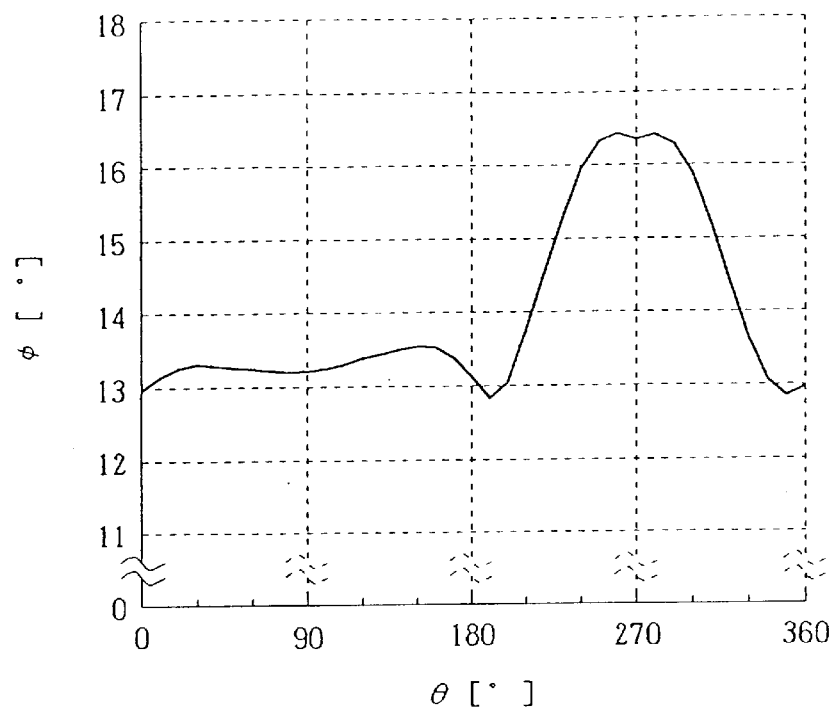
FIG. 3 is a diagram showing a change in the angle between the progressive surface and the angle rim surface in a first embodiment of the present invention.
Figure 27:
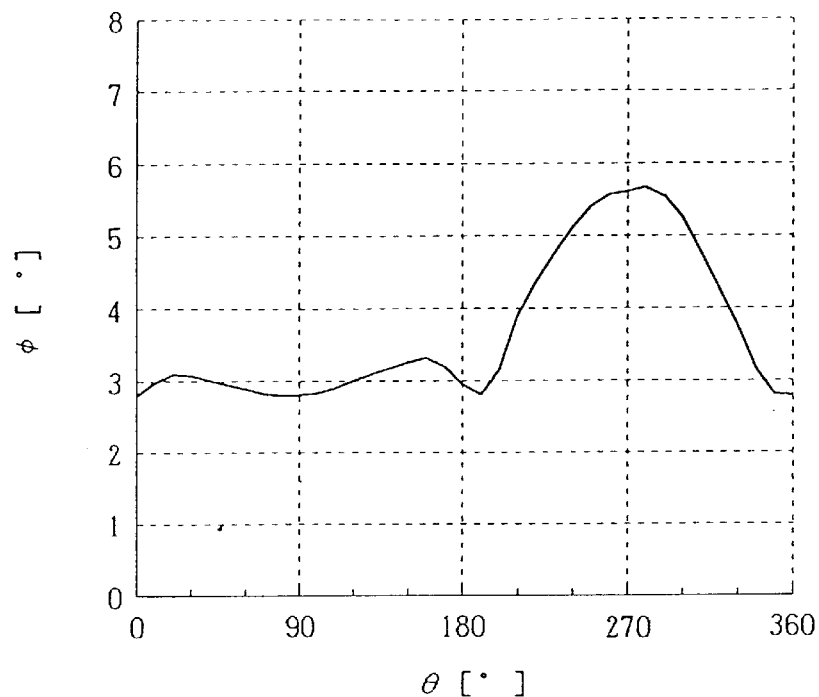
FIG. 27 is a graph showing a change in the angle between the progressive surface and the rim surface in a first known progressive power lens; and, FIG. 28 is a graph showing a change in the angle between the progressive surface and the rim surface in a second known progressive power lens.
Figure 28:
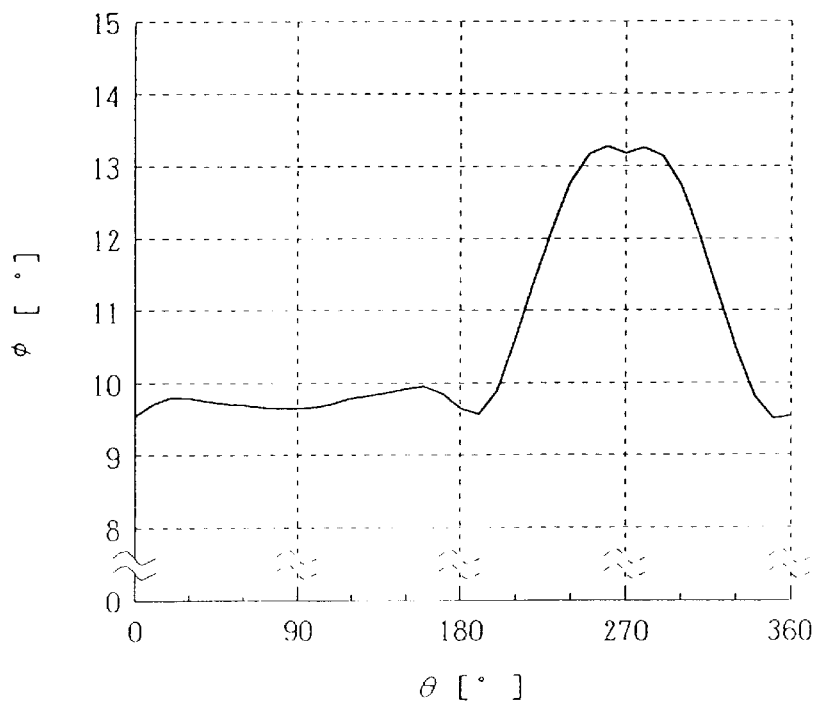

FIG. 3 shows an aφ–θ diagram of a progressive power lens, corresponding to FIG. 27. Comparing FIG. 3 and FIG. 27, it can be understood that the values of φ in the illustrated embodiment are larger than those in FIG. 27 by around 10 degrees. Namely, the value of AVG(φ) is increased in the present invention (it can be considered that the values of STD(φ) are substantially the same as those in FIG. 27). Consequently, the coefficient of change (ratio) defined by STD(φ)/AVG(φ) is reduced from 0.28 (prior art) to 0.09.

To obtain the rim surface, the peripheral edge of the mold 51, for forming the progressive surface, is first ground by a coarse grinder 67, which is normally used to form a spherical surface, and then polished. To reduce the width of the rim surface, it is necessary to increase the curvature of the spherical surface in the direction opposite to the curvature of the progressive surface. Nevertheless, if the curvature is excessively increased, it becomes difficult to precisely work or grind the rim surface, as a serious prism error can be caused due to a misfit of the gasket and the molds. Accordingly, the width of the rim surface is determined taking into account the workability and the prism error, as in a second embodiment of the present invention, discussed below.

Figure 5:
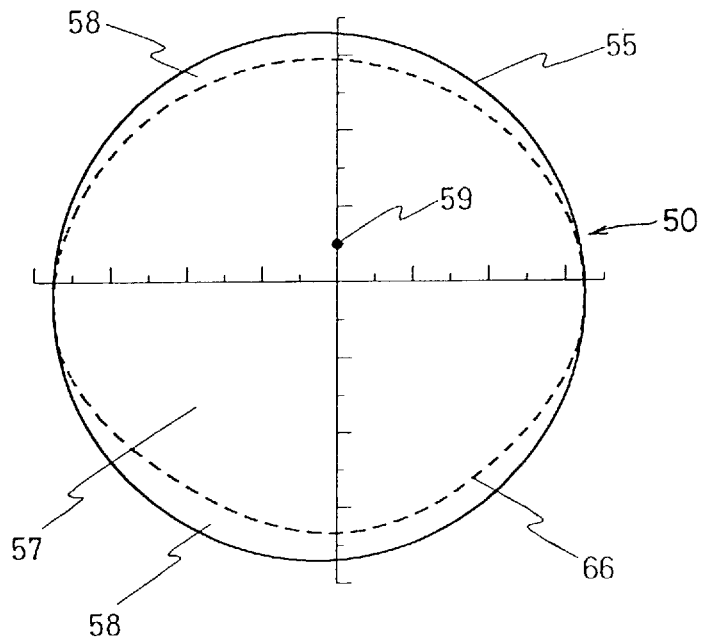
FIG. 5 is a front elevational view of a progressive power lens, according to a second embodiment of the present invention.

FIG. 5 is a front elevational view of a progressive power lens according to a second embodiment of the present invention. The progressive power lens used in the second embodiment is the same as that of the first embodiment. The rim surface 58 is a part of a spherical surface of −2 D (diopter). Due to the restriction of the curvature of the rim surface, the width of the rim surface is reduced from 8.2 mm (prior art) to 3.4 mm, which is practically be negligible. Moreover, not only can the workability of the rim surface be enhanced, but there is also little adverse influence on the prism error.

Figure 6:
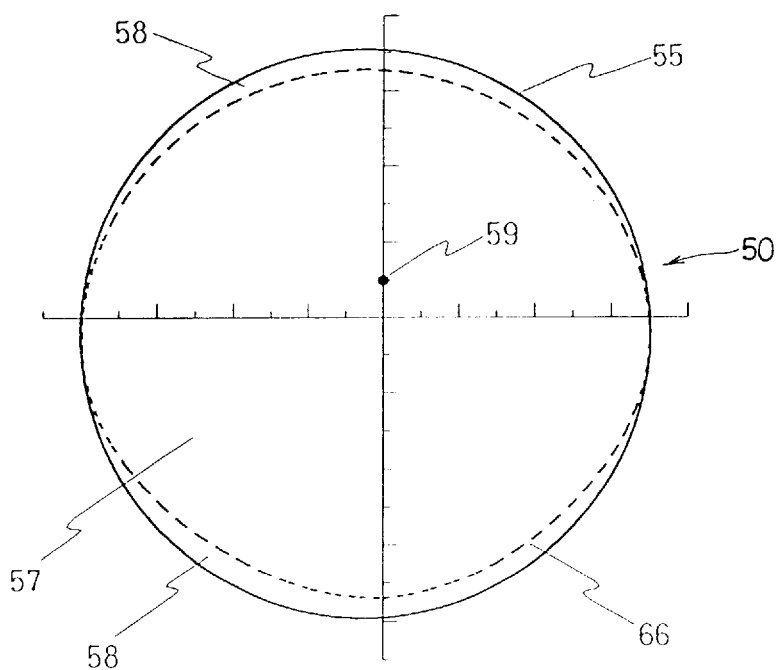
FIG. 6 is a front elevational view of a progressive power lens, according to a third embodiment of the present invention.

FIG. 6 shows a third embodiment of the present invention. In the third embodiment, the curvature of the base curve is not as small as the prior art (first known progressive power lens). Consequently, even if the rim surface 56 is made of a part of a spherical surface of −2 D (diopter), the width of the rim surface can be reduced to be 2.6 mm.

In general, the curve of the progressive surface is more sharp in the vertical section than in the horizontal section. Consequently, the width of the rim surface can be reduced by providing a difference in the curvature between the horizontal section and the vertical section.

Figure 7:
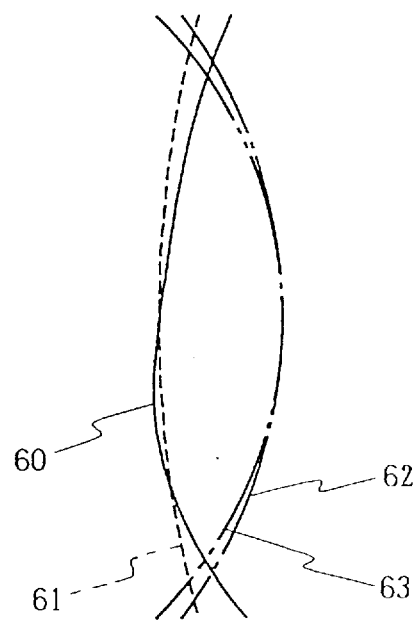
FIG. 7 is a view similar to FIG. 1, according to a fourth embodiment of the present invention.
Figure 8:
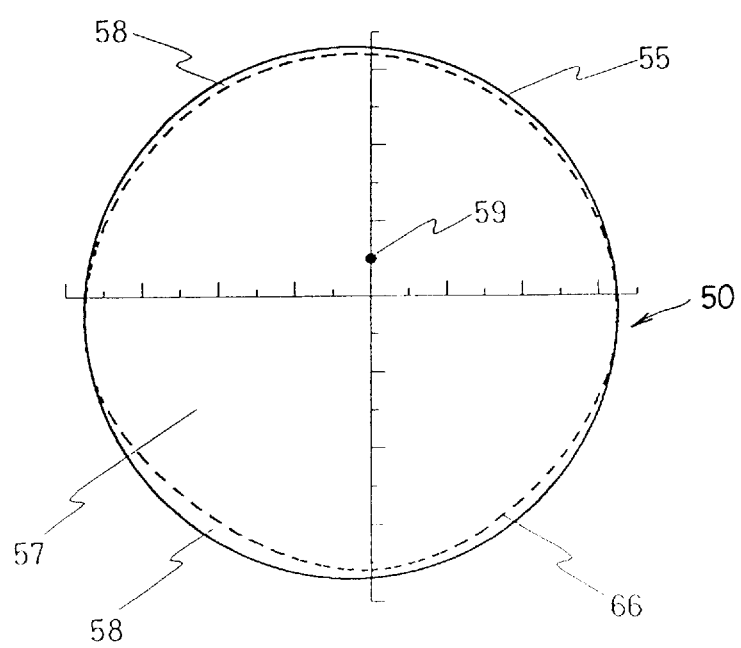
FIG. 8 is a front elevational view of a progressive power lens, according to a fourth embodiment of the present invention.

FIGS. 7 and 8 show a fourth embodiment of the present invention. There is provided a difference in curvature between the horizontal section 63 and the vertical section 62 of the rim surface. FIG. 7 shows a view similar to FIG. 1, in which the vertical and horizontal sections 60 and 62 of the progressive power lens 50 and the vertical and horizontal sections 62 and 63 of the rim surface overlap. FIG. 8 is a front elevational view of a progressive power lens according to the fourth embodiment. In this embodiment, the surface power Dh of the horizontal section 63 is −2.5 D (diopter), and the surface power Dv of the vertical section 62 is a part of a toric surface of −2 D. With this arrangement, the width of the rim surface is reduced to 0.9 mm. To produce a mold for forming the progressive surface having a rim surface defined by a toric surface, the rim surface 58 is first coarsely ground by a toric generator and is then polished.

Figure 9:
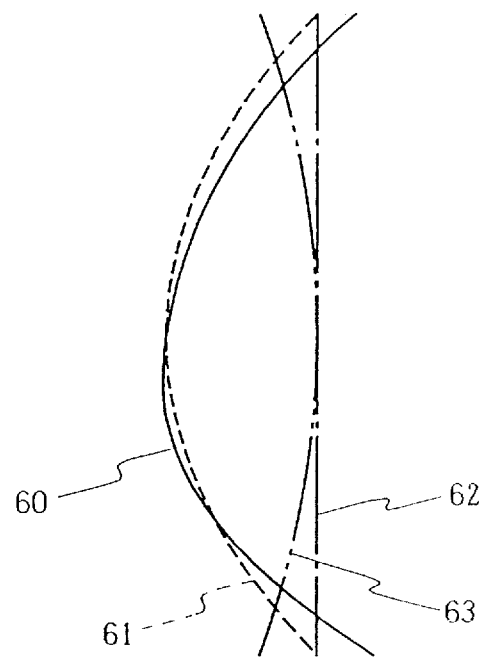
FIG. 9 is a view similar to FIG. 1, according to a fifth embodiment of the present invention.
Figure 10:
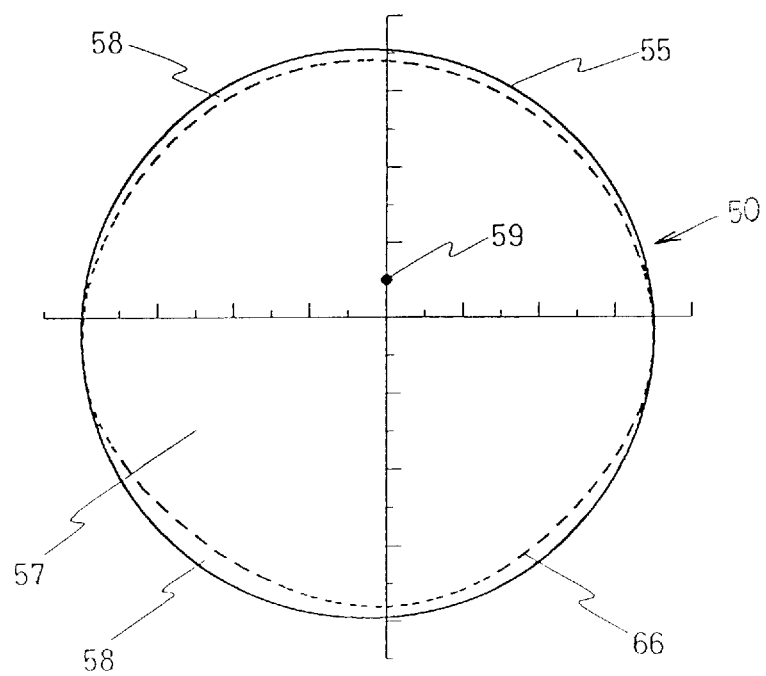
FIG. 10 is a front elevational view of a progressive power lens, according to a fifth embodiment of the present invention.

FIGS. 9 and 10 show a fifth embodiment of the present invention, in which the curvature of the base curve is not as small as the prior art (first known progressive power lens). In this embodiment, it is not necessary for the rim surface 58 to be made of a toric surface. Namely, the rim surface is defined by a part of a cylindrical surface in which the surface power Dh of the horizontal section 63 is −0.5 D and the surface power Dv of the vertical section 62 is 0 D. The width of the rim surface is therefore reduced to 1.3 mm.

Figure 11:
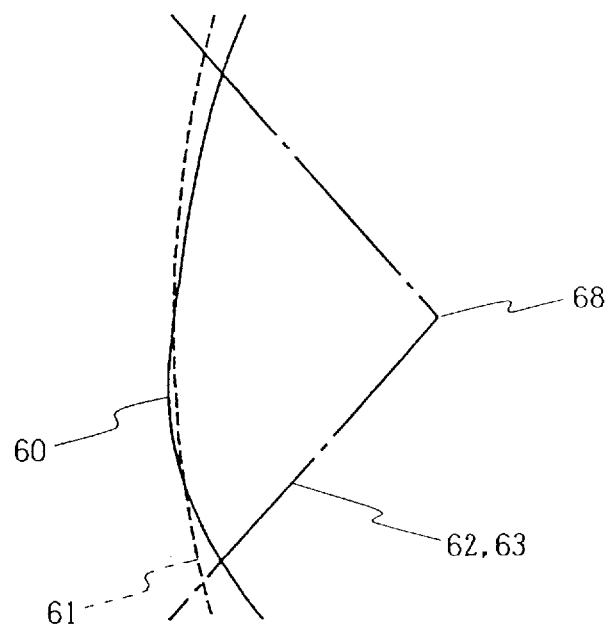
FIG. 11 is a view similar to FIG. 1, according to a sixth embodiment of the present invention.
Figure 12:
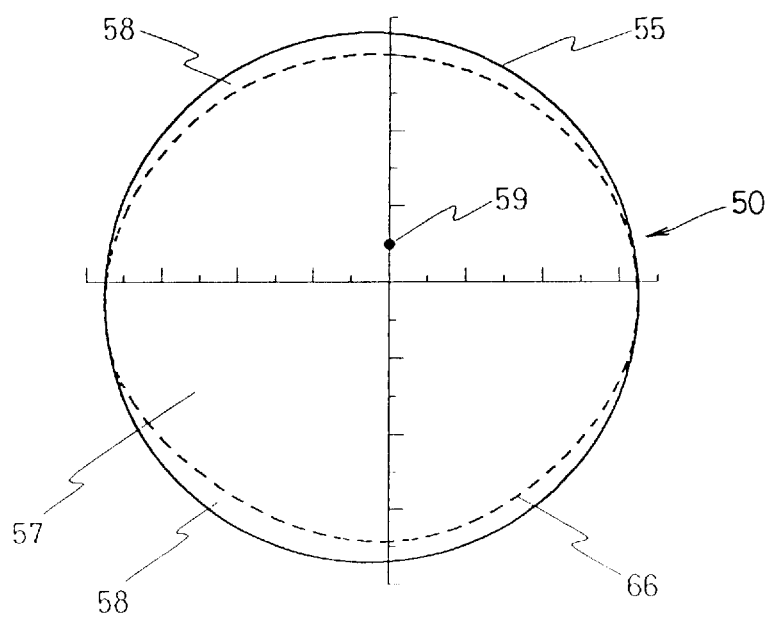
FIG. 12 is a front elevational view of a progressive power lens, according to a sixth embodiment of the present invention.

FIGS. 11 and 12 show a sixth embodiment of the present invention. In the sixth embodiment, the rim surface is defined by a part of a conical surface whose apex angle is 160 degrees. The direction of the apex 68 of the cone is opposite to the direction of the convex progressive surface 57. The width of the rim surface is reduced to 2.6 mm. The apex angle of the conical surface can be selected to be an appropriate value smaller than about 170 degrees. If the apex angle exceeds 170 degrees, there is no remarkable difference between the present invention and the prior art (180 degrees).

Figure 4:
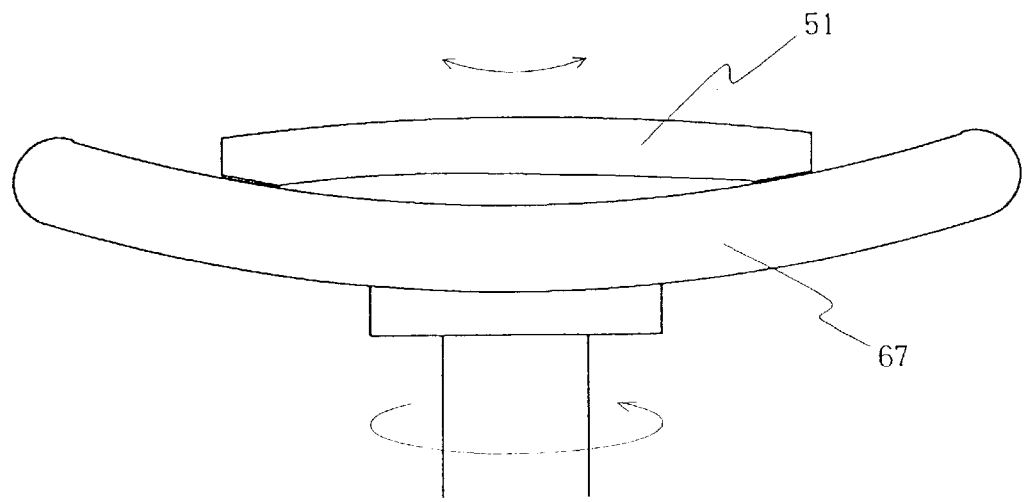
FIG. 4 is a schematic view to explain the process to produce a rim surface, according to a first embodiment of the present invention.
Figure 13:
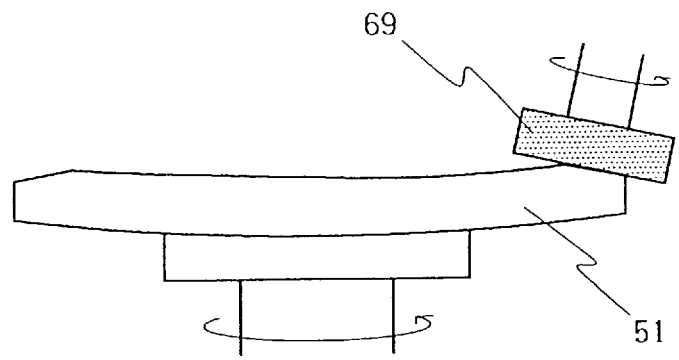
FIG. 13 is a schematic view to explain the process to produce a rim surface, according to a sixth embodiment of the present invention.

FIG. 13 shows an example of a rim surface which has a partial conical surface. The conical grinder can be used instead of the coarse grinder 67 shown in FIG. 4. Alternatively, a cylindrical, disc-shaped, or cup-shaped grinder 69 can be used to grind the peripheral edge of the mold, as shown in FIG. 13.

Figure 14:
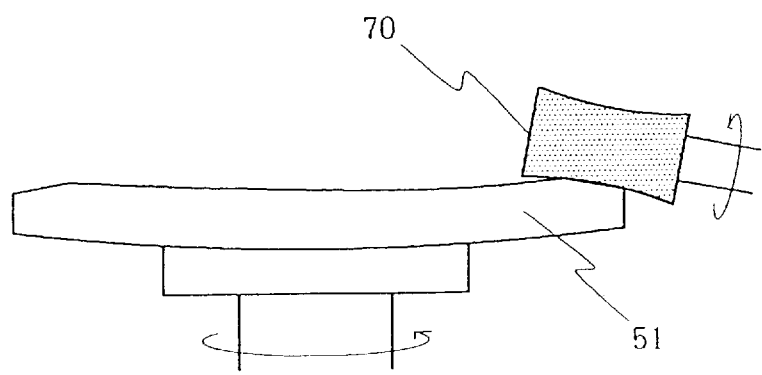
FIG. 14 is a schematic view to explain the process to produce a rim surface which is in the form of a toroidal surface.
Figure 15:
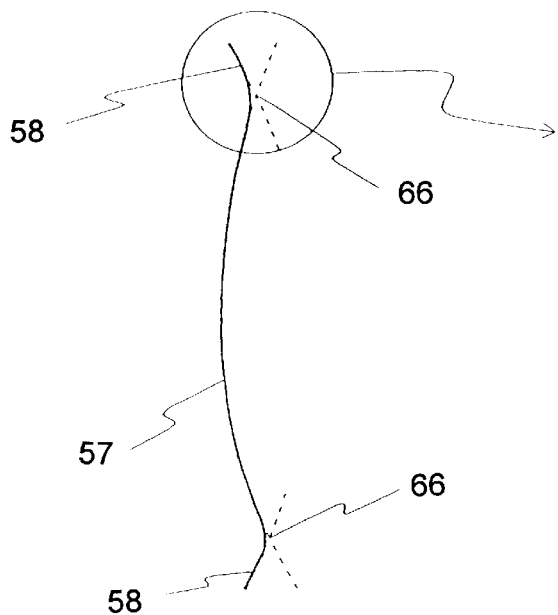
Figure 15:
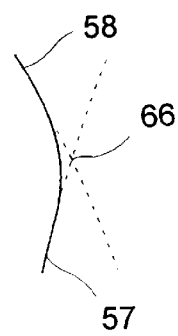
Figure 16:
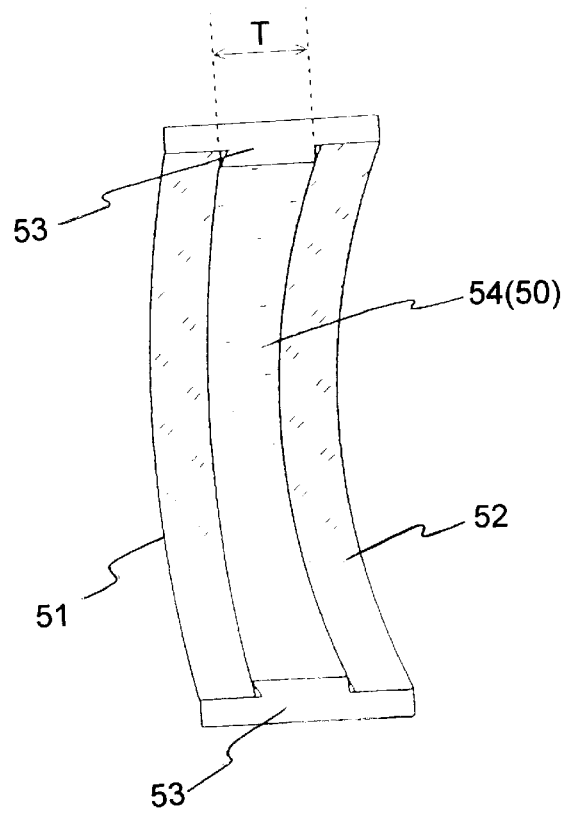
FIG. 16 is a schematic view showing a method for producing a known plastic lens.

As shown in FIG. 14, an hourglass-shaped or sheave-shaped grinder 70 forms, a rim surface with a partial toroidal surface, including a doughnut-shaped surface. In this case, the technical advantage that the width of the rim surface is reduced can be equally obtained.

Numerical data of the progressive power lens according to the first to sixth embodiments of the present invention and the two prior art examples are shown in Table 1 below. Note that in all the lenses, the addition power is 3.00 D and the refractive index of the blank material is 1.6.

TABLE 1

| | whole lens diameter (mm) | average surface power at distance reference point (Df) | form of non-progressive surface (rim surface) |
|---|---|---|---|
| Example 1 | 70 | 0.12 | plane (Ds = 0) |
| Example 2 | 75 | 2.04 | plane (Ds = 0) |
| Embodiment 1 | 70 | 0.12 | spherical (Ds = −3) |
| Embodiment 2 | 70 | 0.12 | spherical (Ds = −2) |
| Embodiment 3 | 75 | 2.04 | spherical (Ds = −2) |
| Embodiment 4 | 70 | 0.12 | toric * |
| Embodiment 5 | 75 | 2.04 | cylindrical ** |
| Embodiment 6 | 70 | 0.12 | conical *** |

| | STD(φ)/AVG(φ) | width of the rim surface (mm) |
|---|---|---|
| Example 1 | 0.28 | 8.2 |
| Example 2 | 0.13 | 4.1 |
| Embodiment 1 | 0.09 | 2.7 |
| Embodiment 2 | 0.11 | 3.4 |
| Embodiment 3 | 0.08 | 2.6 |
| Embodiment 4 | 0.10 | 0.9 |
| Embodiment 5 | 0.11 | 1.3 |
| Embodiment 6 | 0.09 | 2.6 |

* Dh = −2.5, Dv = −2
** Dh = −0.5, Dv = 0
*** Ω = 160

Although the progressive surface and the rim surface (non-progressive surface) are clearly separated by the boundary 66 in the above discussion, the present invention can be equally applied when the boundary is a smooth boundary 66 which is smoothed by a grinder, etc. In this case, the boundary is defined by an intersecting line which is obtained by extrapolating the progressive surface and the rim surface. The angle formed between the progressive surface and the rim surface refers to that for the extrapolated progressive surface and the rim surface.

As can be seen from the above discussion, according to the present invention, a progressive power lens which is provided on the peripheral edge thereof with a rim surface portion (non-progressive surface) in which the width of the rim surface is reduced even if the curvature of the base curve of the progressive surface is small, can be provided. Also, according to the present invention, a mold to produce such a progressive power lens can be easily provided.

I claim:

1. A progressive power lens having an effective surface, comprising:
    a progressive surface portion which progressively varies a power; and
    a peripheral rim surface portion which does not function as a progressive surface portion and which is disposed about at least a portion of said effective surface of said lens, wherein said peripheral rim surface portion is a portion of a symmetrically curved surface, said peripheral rim surface portion having a common sign opposite a sign of said progressive surface portion.

2. A progressive power lens according to claim 1, wherein said lens satisfies the following relationships:

$Df \leq 3$ and $STD(\phi)/AVG(\phi) \leq 0.15$ wherein $STD(\phi)$ represents the standard deviation of $\phi$ over an entire circumferential length of the lens;

$AVG(\phi)$ represents the mean value of $\phi$ over said entire circumferential length of the lens;

Df represents an average surface power at a distance reference point of said progressive surface portion; and, $\phi$ represents an angle defined by said progressive surface portion and said rim surface portion at a boundary therebetween.

3. A progressive power lens according to claim 2, wherein said lens further satisfies the following relationships:

$Df \leq 2$ and $STD(\phi)/AVG(\phi) \leq 0.1$.

4. A progressive power lens according to claim 1, wherein said rim surface portion comprises a portion of a spherical surface which projects in a direction opposite to a projecting direction of said progressive surface portion.

5. A progressive power lens according to claim 4, wherein a surface power Ds of said rim surface portion and an average surface power Df at the distance reference point of said progressive surface portion have different signs.

6. A progressive power lens according to claim 5, wherein said lens satisfies the following relationships:

$Df \leq 3$ and $Ds \leq Df-2$.

7. A progressive power lens according to claim 6, wherein said lens satisfies the following relationships:

$Df \leq 2$ and $Ds \leq Df-3$.

8. A progressive power lens according to claim 1, wherein said rim surface portion comprises a portion of one of a toric surface, a toroidal surface, and a cylindrical surface, and surface powers of said one of said toric surface, said toroidal surface, and said cylindrical surface in the vertical direction and in the horizontal direction Dv and Dh, respectively, satisfy the following relationship:

$Dh \leq Dv$.

9. A progressive power lens according to claim 1, wherein said rim surface portion comprises a portion of a toric surface which projects in a direction opposite to a projecting direction of said progressive surface portion.

10. A progressive power lens according to claim 1, wherein said rim surface portion comprises a portion of a cylindrical surface which projects in a direction opposite to a projecting direction of said progressive surface portion.

11. A progressive power lens according to claim 8, wherein said lens satisfies the following relationships:

$Df \leq 3$ and $(Dh+Dv)/2 \leq Df-2$.

12. A progressive power lens according to claim 1, wherein said rim surface portion comprises a portion of a conical surface with an apex oriented in a direction opposite to a projecting direction of said progressive surface portion.

13. A progressive power lens according to claim 12, wherein said lens satisfies the following relationships:

$$Df \leq 3 \text{ and}$$

$$\Omega \leq 170$$

wherein

Df represents an average surface power at a distance reference point of said progressive surface portion; and, Ω represents an apex angle of the conical surface.

14. A progressive lens according to claim 1, said progressive surface portion not being a stepped surface.

15. A mold for producing a progressive power lens, said mold comprising a forming portion which forms an effective surface including a progressive surface, which progressively varies a power of the lens, and a curved rim surface forming portion which is a portion of a symmetrically curved surface, which forms a rim of the lens and which does not function as a progressive surface, said curved rim surface forming portion having a common sign opposite a sign of said effective surface.

16. The mold for producing a progressive power lens according to claim 15, wherein said rim surface portion comprises a portion of a spherical surface which projects in a direction opposite to a projecting direction of said progressive surface portion.

17. The mold for producing a progressive power lens according to claim 15, wherein said rim surface portion comprises a portion of one of a toric surface, a toroidal surface, and a cylindrical surface, and surface powers of said one of said toric surface, said toroidal surface, and said cylindrical surface in the vertical direction and in the horizontal direction Dv and Dh, respectively, satisfy the following relationship:

$$Dh \leq Dv.$$

18. The mold for producing a progressive power lens according to claim 15, wherein said rim surface portion comprises a portion of a toric surface which projects in a direction opposite to a projecting direction of said progressive surface portion.

19. The mold for producing a progressive power lens according to claim 15, wherein said rim surface portion comprises a portion of a cylindrical surface which projects in a direction opposite to a projecting direction of said progressive surface portion.

20. The mold for producing a progressive power lens according to claim 15, wherein said rim surface portion comprises a portion of a conical surface with an apex oriented in a direction opposite to a projecting direction of said progressive surface portion, said lens satisfying the following relationships $$Df \leq 3 \text{ and}$$

$$\Omega \leq 170$$

wherein

Df represents an average surface power at a distance reference point of the progressive surface portion; and Ω represents an apex angle of the conical surface.

21. The mold for producing a progressive power lens according to claim 15, the progressive surface not being a stepped surface.

* * * * *